(12) United States Patent
Kurasawa et al.

(10) Patent No.: US 11,079,274 B2
(45) Date of Patent: Aug. 3, 2021

(54) SPECTROSCOPIC SYSTEM

(71) Applicant: Seiko Epson Corporation, Tokyo (JP)

(72) Inventors: Hikaru Kurasawa, Shiojiri (JP); Naoki Kuwata, Shiojiri (JP); Ryoki Watanabe, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/776,606

(22) Filed: Jan. 30, 2020

(65) Prior Publication Data

US 2020/0249086 A1 Aug. 6, 2020

(30) Foreign Application Priority Data

Jan. 31, 2019 (JP) .............................. JP2019-016093

(51) Int. Cl.
*G01J 3/26* (2006.01)
*G01J 3/10* (2006.01)
*G01J 3/02* (2006.01)
*G01J 3/28* (2006.01)

(52) U.S. Cl.
CPC ................. *G01J 3/10* (2013.01); *G01J 3/021* (2013.01); *G01J 3/26* (2013.01); *G01J 3/2823* (2013.01)

(58) Field of Classification Search
CPC ...... G01J 3/10; G01J 3/26; G01J 3/021; G01J 3/2823; G01J 3/28; G01J 3/0202; G01J 3/0272; G01N 21/27; G01N 21/255; G01N 21/01; G01N 2021/0112; G03B 17/12; G03B 17/17

See application file for complete search history.

(56) References Cited

U.S. PATENT DOCUMENTS

| 4,254,337 A * | 3/1981 | Yasujima | ............... | G01B 11/06 |
| | | | | 250/339.06 |
| 6,246,474 B1 * | 6/2001 | Cerni | ..................... | A61B 90/36 |
| | | | | 356/335 |

FOREIGN PATENT DOCUMENTS

JP 2008-209280 A 9/2008

* cited by examiner

*Primary Examiner* — Abdullahi Nur
(74) *Attorney, Agent, or Firm* — Harness, Dickey & Pierce, P.L.C.

(57) ABSTRACT

A spectroscopic system includes a main body including a light source that radiates light to a light transmissive measurement target, an imaging device that captures an image based on transmitted light having passed through the measurement target, and a spectroscopy section that is provided in an optical path between the light source and the imaging device and selectively transmits light that belongs to a specific wavelength region, and an attachment that includes an optical path changer that changes the direction of the optical path of the light outputted from the light source and is so attached to the main body as to form a placement space which is located between the optical path changer and the main body and in which the measurement target is placed.

9 Claims, 8 Drawing Sheets

SPECTROSCOPIC SYSTEM

The present application is based on, and claims priority from, JP Application Serial Number 2019-016093, filed Jan. 31, 2019, the disclosure of which is hereby incorporated by reference herein in its entirety.

BACKGROUND

1. Technical Field

The present disclosure relates to a spectroscopic system.

2. Related Art

There has been a known spectroscopic camera in which an imaging device receives light spectrally separated by a spectroscopic device and acquires the amount of the received light to perform spectrometry, that is, a known spectrometry apparatus (see JP-A-2008-209280, for example).

The spectrometry apparatus described in JP-A-2008-209280 includes a liquid container that contains a liquid that is a measurement target, a light source that outputs light toward the liquid container, a spectroscopy section that spectrally separates light having passed through the liquid, and a light receiver that receives the spectrally separated light. The spectrometry apparatus acquires a specific wavelength and the shape of a spectrum by scanning the light received by the light receiver over an entire measurement range to identify, for example, the material of which the liquid is formed.

The apparatus described in JP-A-2008-209280 is, however, an apparatus for measuring a measurement target and is therefore useful only in a limited application and has poor versatility. Further, even when the apparatus to which another function is imparted is used for a purpose other than the target measurement, the liquid container becomes an obstacle that hinders the added function. That is, the size of the apparatus undesirably increases by the amount corresponding to the liquid container.

SUMMARY

The present disclosure can be implemented as the following application example.

A spectroscopic system according to an application example of the present disclosure include a main body including a light source that radiates light to a light transmissive measurement target, an imaging device that captures an image based on transmitted light having passed through the measurement target, and a spectroscopy section that is provided in an optical path between the light source and the imaging device and selectively transmits light that belongs to a specific wavelength region, and an attachment member that includes an optical path changer that changes a direction of an optical path of the light outputted from the light source and is so attached to the main body as to form a placement space which is located between the optical path changer and the main body and in which the measurement target is placed.

DESCRIPTION OF EXEMPLARY EMBODIMENTS

A spectroscopic system according to the present disclosure will be described below in detail based on preferable embodiments shown in the accompanying drawings.

First Embodiment

Figure 1:
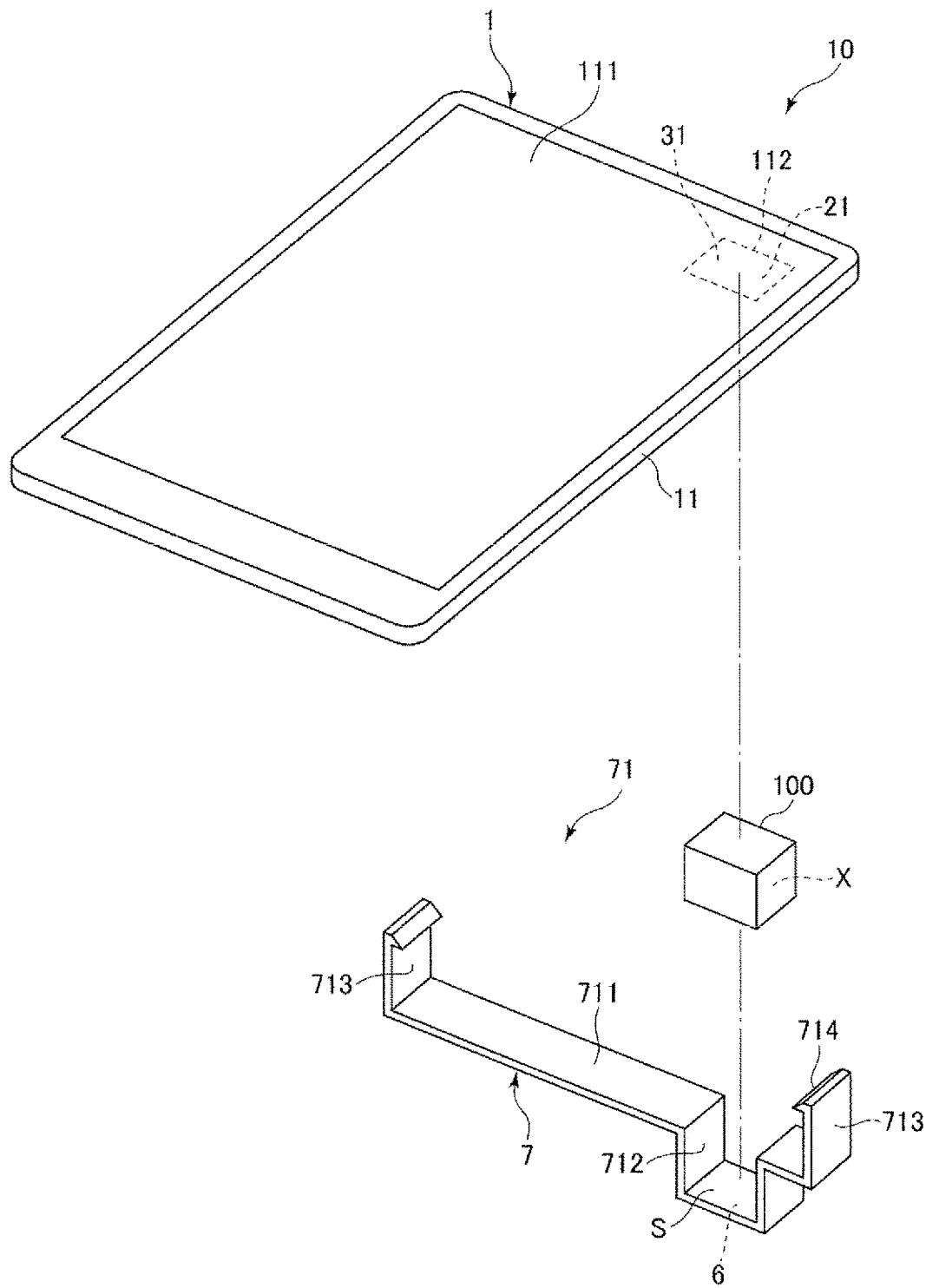
FIG. 1 is an exploded perspective view of a spectroscopic system according to a first embodiment of the present disclosure.
Figure 2:
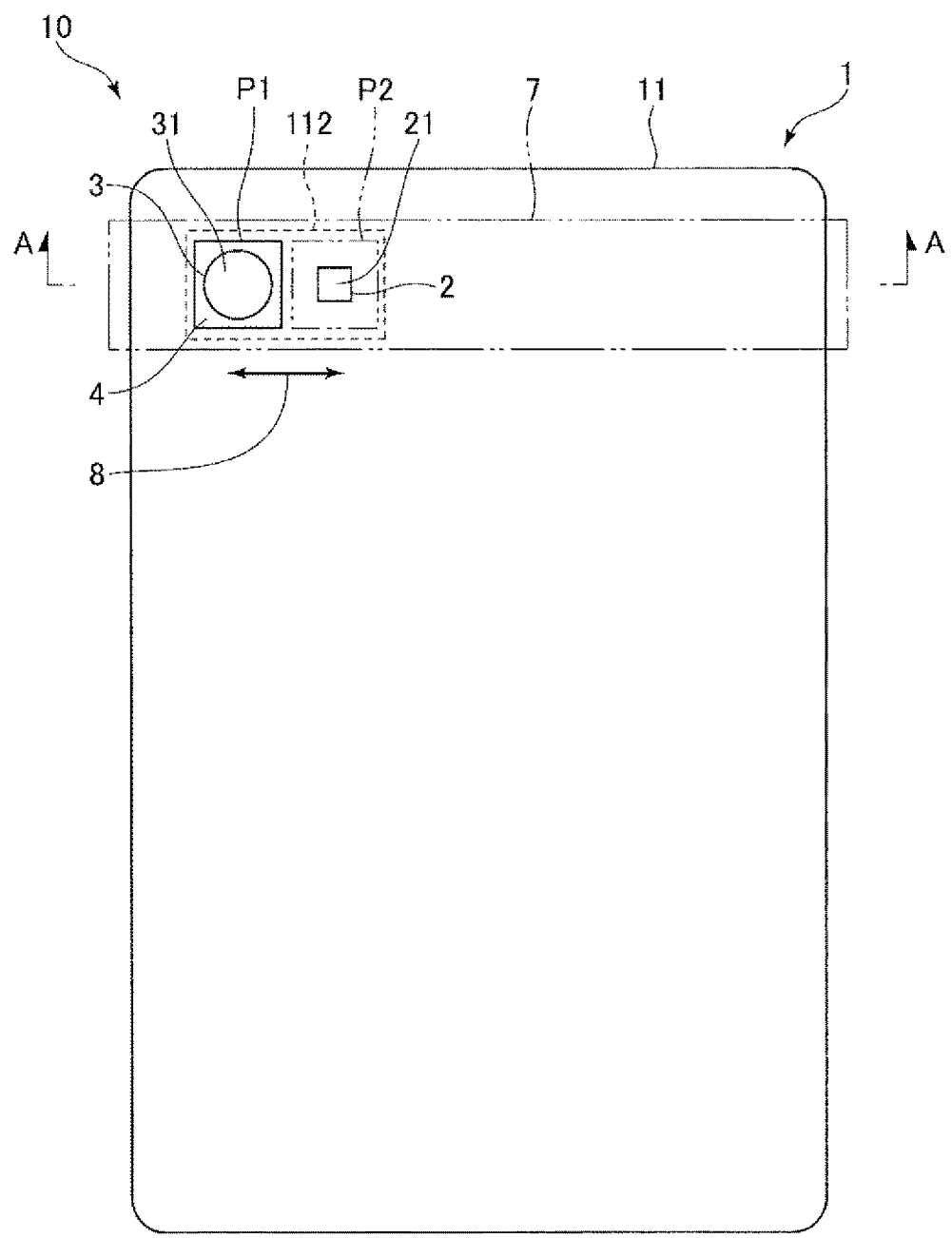
FIG. 2 shows a main body of the spectroscopic system shown in FIG. 1 viewed from the side facing the rear surface of the main body.
Figure 3:
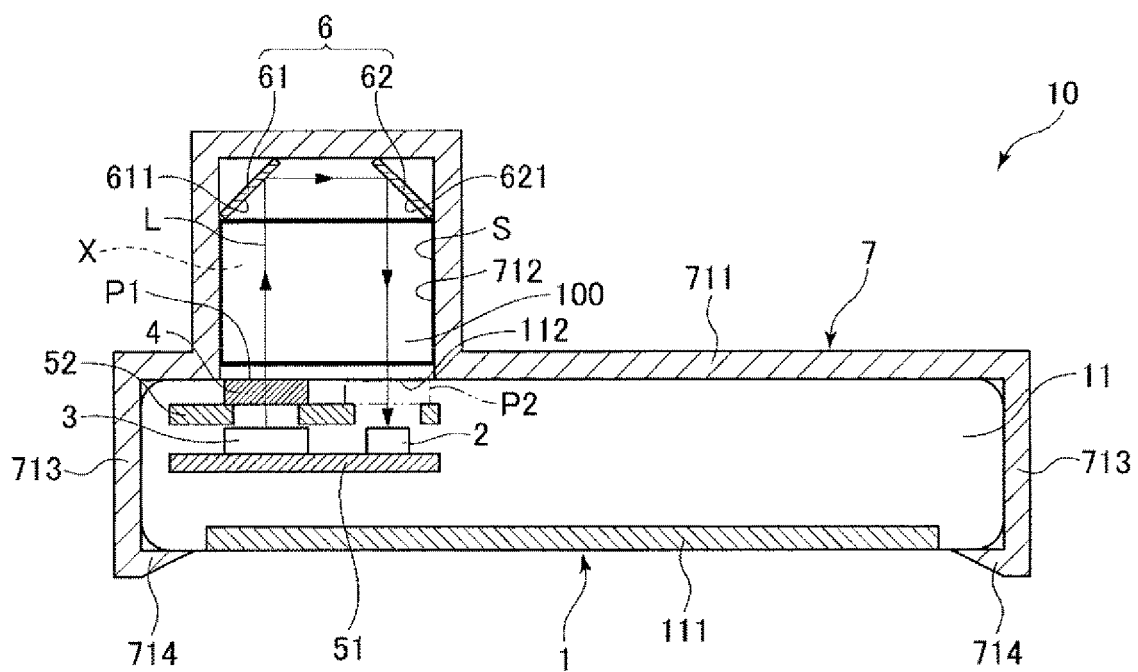
FIG. 3 is a cross-sectional view of the spectroscopic system taken along the line A-A in FIG. 2.
Figure 4:
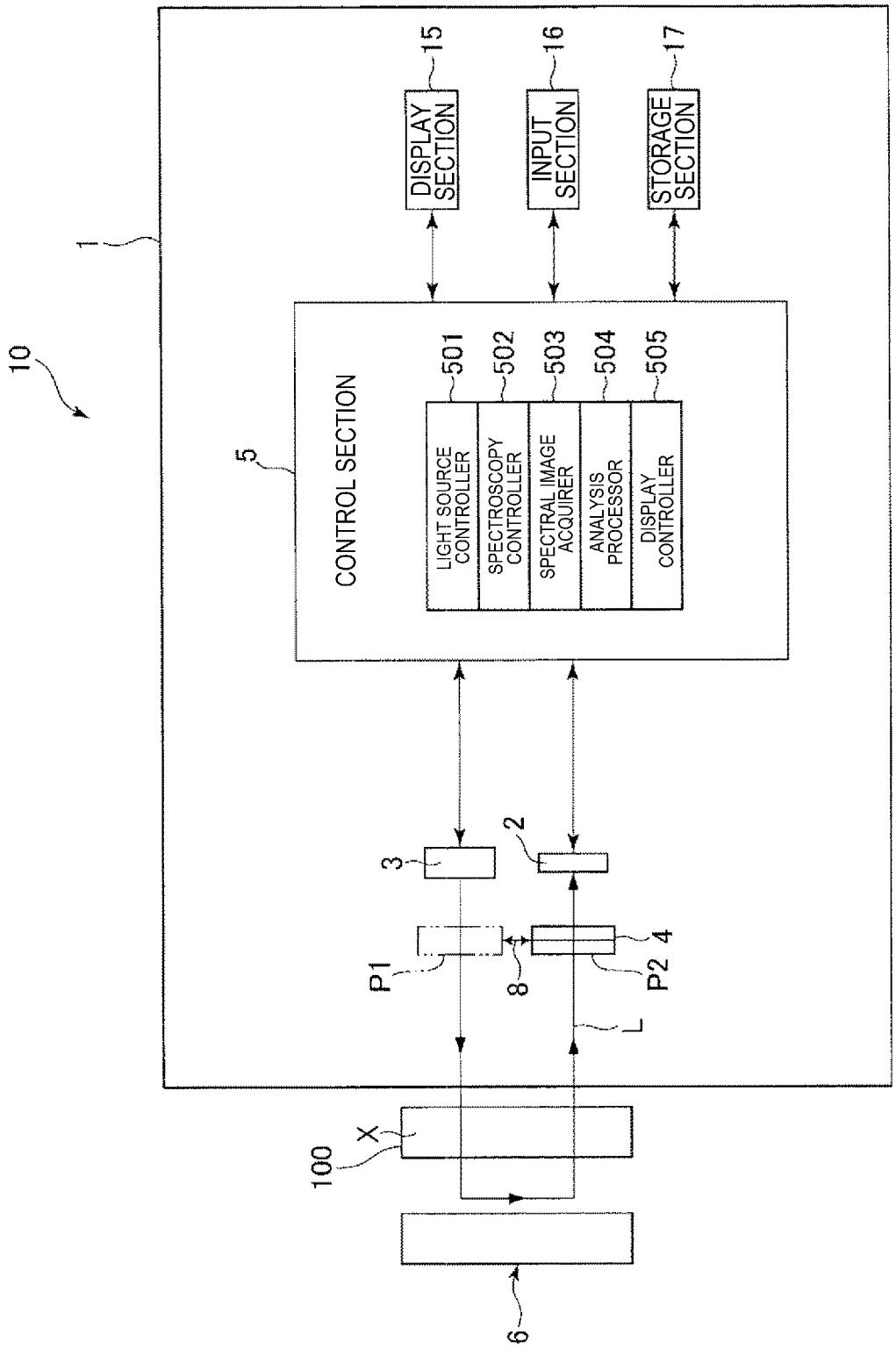
FIG. 4 is a block diagram showing a schematic configuration of the spectroscopic system shown in FIG. 1.
Figure 5:
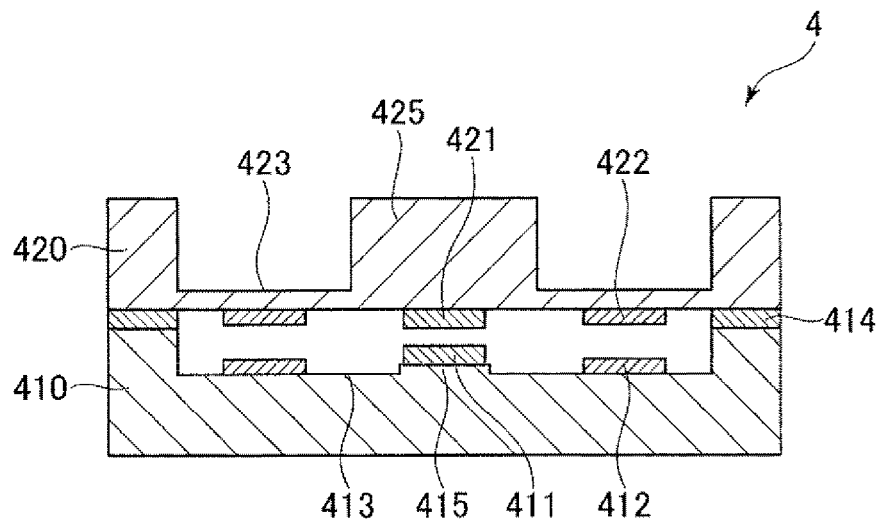
FIG. 5 is a cross-sectional view showing an example in which a Fabry-Perot etalon filter is used as a wavelength variable interference filter provided in a spectroscopy section provided in the spectroscopic system shown in FIG. 1.
Figure 6:
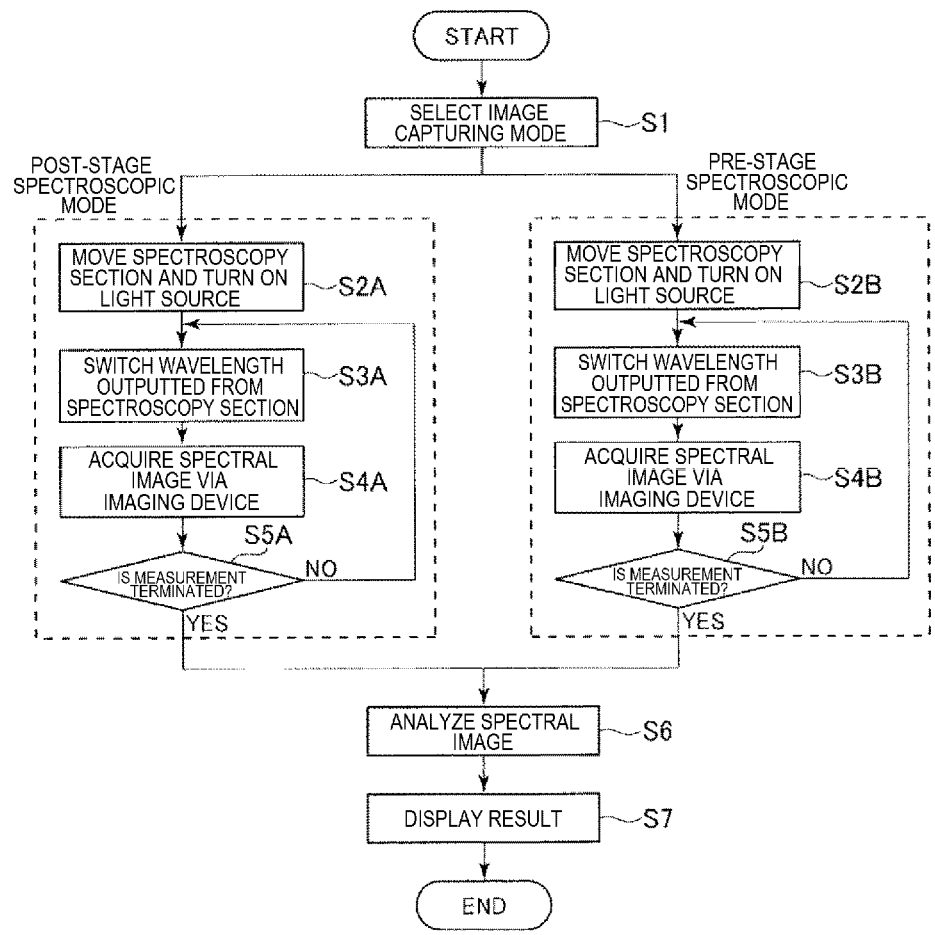
FIG. 6 is a flowchart showing a measurement method for spectrally measuring a measurement target by using the spectroscopic system shown in FIG. 1.

FIG. 1 is an exploded perspective view of the spectroscopic system according to a first embodiment of the present disclosure. FIG. 2 shows a main body of the spectroscopic system shown in FIG. 1 viewed from the side facing the rear surface of the main body. FIG. 3 is a cross-sectional view of the spectroscopic system taken along the line A-A in FIG. 2. FIG. 4 is a block diagram showing a schematic configuration of the spectroscopic system shown in FIG. 1. FIG. 5 is a cross-sectional view showing an example in which a Fabry-Perot etalon filter is used as a wavelength variable interference filter provided in a spectroscopy section provided in the spectroscopic system shown in FIG. 1. FIG. 6 is a flowchart showing a measurement method for spectrally measuring a measurement target by using the spectroscopic system shown in FIG. 1.

Figure 7:
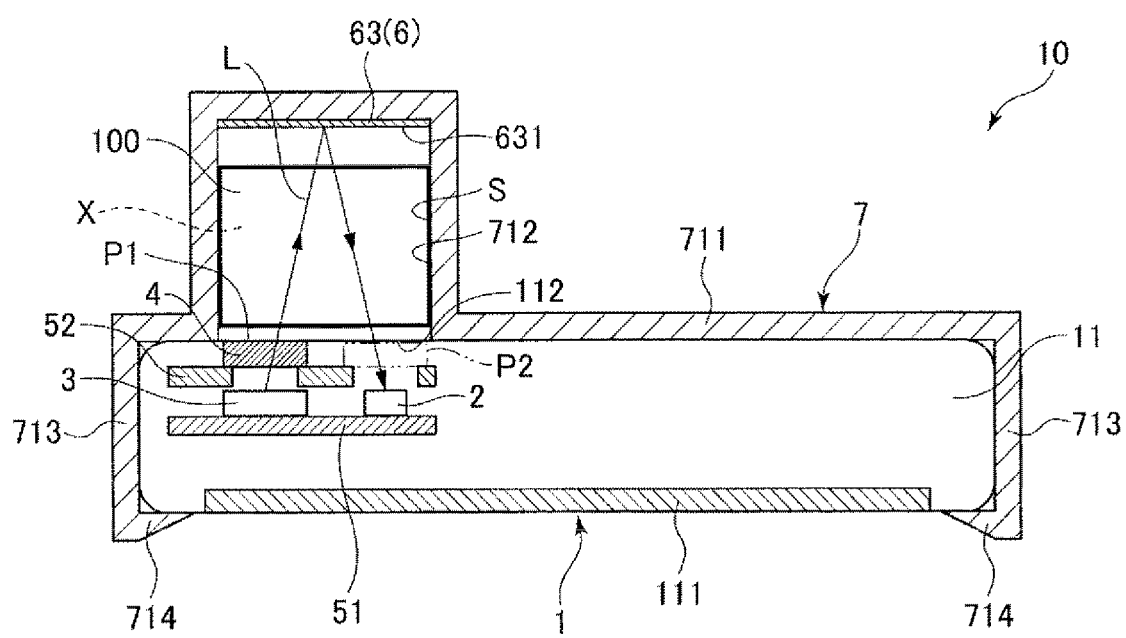
FIG. 7 is a cross-sectional view of a spectroscopic system according to a second embodiment of the present disclosure.
Figure 8:
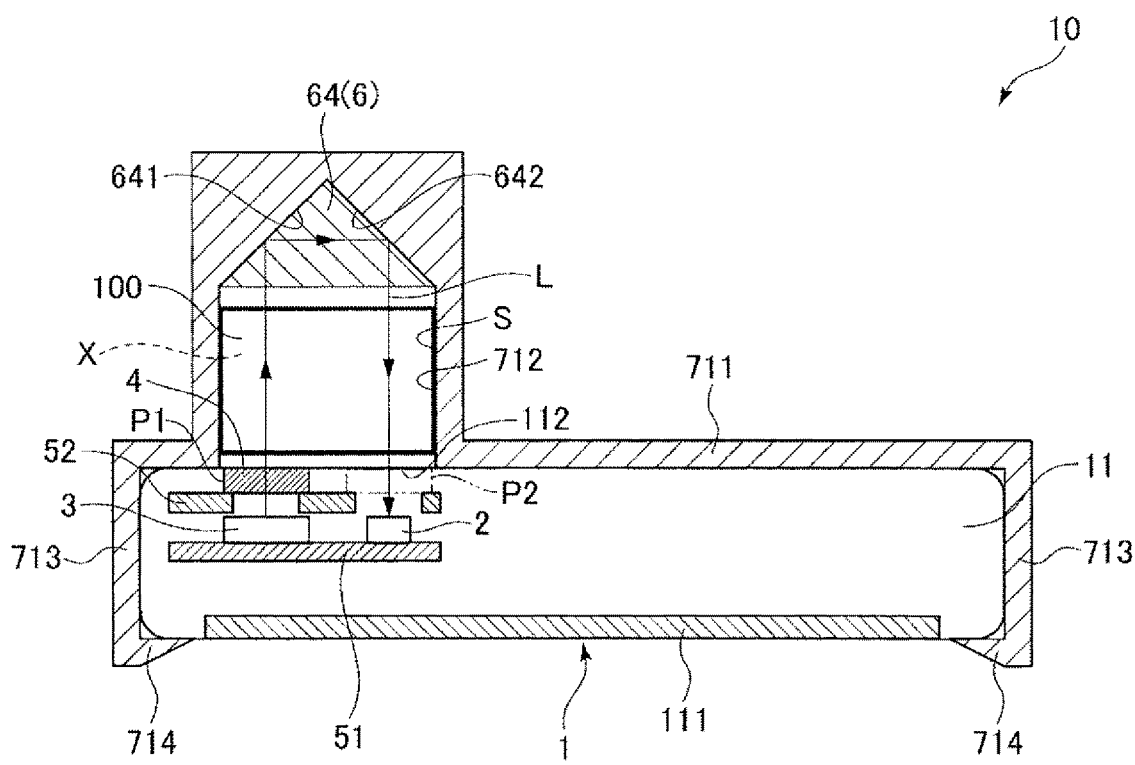
FIG. 8 is a cross-sectional view of a spectroscopic system according to a third embodiment of the present disclosure.
Figure 9:
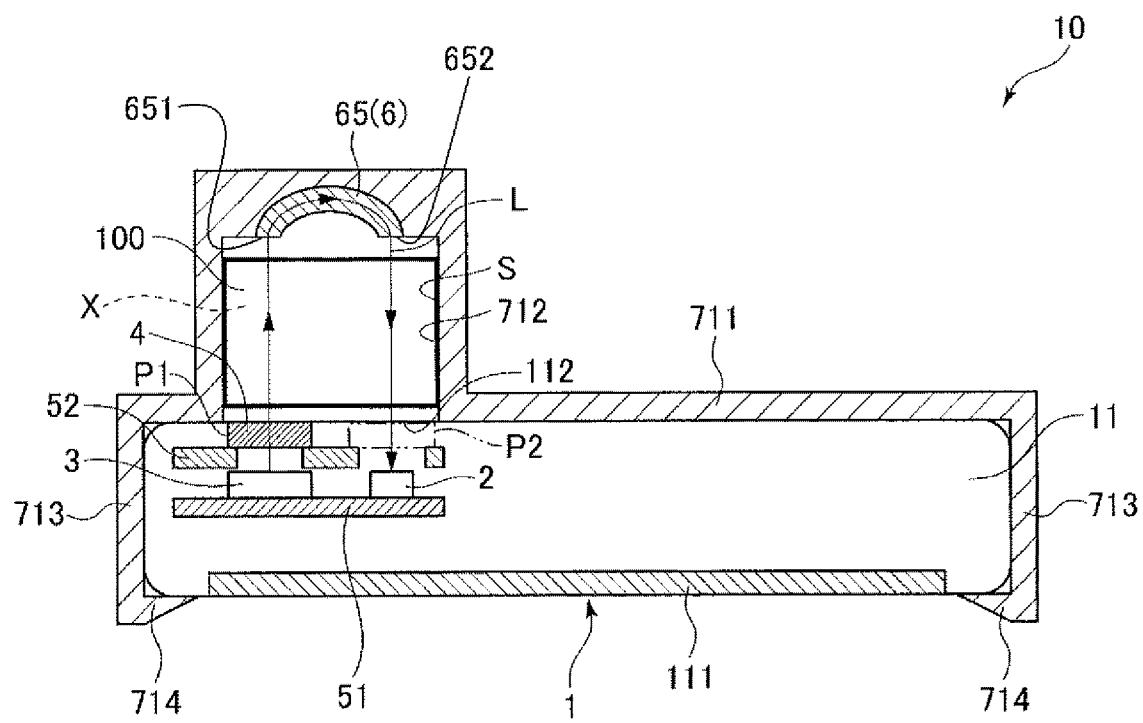
FIG. 9 is a cross-sectional view of a spectroscopic system according to a fourth embodiment of the present disclosure.

In FIGS. 1 to 3 and 5, the upper side is called "an upper side," and the lower side is called "a lower side." In FIG. 2, the right side is called "a right side," and the left side is called "a left side." In FIGS. 3 and 4, the arrow represents the center of light that is outputted from a light source and incident on an imaging device, that is, the optical axis of the light (the same holds true for FIGS. 7 to 9). The optical axis is also called an optical path in some cases for convenience.

A spectroscopic system 10 shown in FIGS. 1 to 4 includes a main body 1, which includes an imaging device 2, a light source 3, a spectroscopy section 4, and a control section 5, which controls the action of each of the components described above, and an attachment member 7, which includes an optical path changer 6 and is attached to the main body 1. In a state in which the attachment member 7 is attached to the main body 1, a placement space S, in which a measurement target X is placed, is formed between the optical path changer 6 and the main body 1. The spectroscopic system 10 can identify the measurement target X placed in the placement space S and display the characteristics and constituent components of the measurement target X, the presence or absence of the measurement target X in an image capturing area, and other pieces of information on the measurement target X on a display 111 provided in the main body 1. The above portions of the spectroscopic system 10 will be described below.

Main Body 1

Enclosure 11

The main body 1 is an electronic apparatus having an imaging function and is shown as an apparatus used as a smartphone by way of example. The main body 1 includes an enclosure 11, which accommodates the imaging device 2, the light source 3, the spectroscopy section 4, the controller 5, and other components.

The enclosure 11 has a substantially oblong shape in the plan view and includes a display 111 on the front side and a light incident/exiting section 112, via which light is incident on the imaging device 2 and the light from the light source 3 exits, on the rear side. The light incident/exiting section 112 includes a light incident section 21, which will be described later, via which light is incident on the imaging device 2, and a light exiting section 31, via which light from the light source 3 exits.

The display 111 is formed of a touch panel including a touch sensitive surface and a sensor for detecting the magnitude of contact with the touch sensitive surface and accepts a user's (operator's) input operation. That is, in the present embodiment, the display 111 serves both as a display section 15 and an input section 16. The sensor may detect static electricity or may detect pressure.

The attachment member 7 is detachably attached to the enclosure 11, as will be described later.

Imaging Device 2

The imaging device 2 function as a detector that captures an image based on transmitted light having passed through the measurement target X to detect the transmitted light. The imaging device 2 is formed, for example, of a CCD or a CMOS device, and mounted on a circuit substrate 51 disposed in the enclosure 11. The light incident section 21, via which light is incident on the imaging device 2, faces the rear surface of the enclosure 11. The imaging device 2 can thus receive light incident via the rear surface of the enclosure 11 and capture the light as an image. The thus configured imaging device 2 is electrically coupled to the control section 5, which controls the action of the imaging device 2.

Light Source 3

The light source 3 radiates light L toward the measurement target X. The light source 3 is mounted on the circuit substrate 51, which disposed in the enclosure 11 of the main body 1, and the light exiting section 31, via which light from the light source 3 exits, faces the rear surface of the enclosure 11. The light source 3 can thus radiate the light L toward the rear surface. The light L outputted from the light source 3 passes through the measurement target X, passes through the optical path changer 6, which will be described later and changes the optical path of the light L, and the resultant light L is incident on the imaging device 2.

Examples of the thus configured light source 3 may include an LED light source, an OLED light source, a xenon lamp, and a halogen lamp. A preferable example of the light source 3 is a light source capable of radiating white light that is intense over the entire wavelength region over which the spectroscopy section 4, which is formed of a wavelength variable interference filter, performs spectrometry. The light source 3 may include, for example, a light source capable of radiating light having a predetermined wavelength, such as infrared light, in place of a white-light light source.

The light incident section 21 for the imaging device 2 and the light exiting section 31 for the light source 3 are disposed side by side when viewed from the side facing the rear surface of the enclosure 11, as shown in FIG. 2. The light source 3 and the imaging device 2 are so disposed as to face in the same direction, that is, the rear surface of the enclosure 11. The direction in which the light source 3 outputs the light and the direction in which the light is incident on the imaging device 2 are opposite directions. The output of the light L and the capture of an image of the light L can therefore be both performed with the enclosure 11 facing in one direction.

The thus configured light source 3 is electrically connected to the control section 5, which controls the action of the light source 3.

Spectroscopy Section 4

The spectroscopy section 4 can selectively output light having a spectrally separated wavelength that is a specific wavelength from light incident on the spectroscopy section 4 and change the wavelength region to which the output light to be outputted from the spectroscopy section 4 belongs. That is, the spectroscopy section 4 selectively transmits light that belongs to a specific wavelength region.

The spectroscopy section 4 is disposed on a circuit substrate 52 disposed in the enclosure 11, as shown in FIG. 3. The circuit substrate 52 is so disposed as to be shifted from the circuit substrate 51 toward the rear surface of the enclosure 11 and separate from the circuit substrate 51. The spectroscopy section 4 is formed of a wavelength variable interference filter so that the wavelength region to which the output light to be outputted belongs is changeable. The wavelength variable interference filter is not limited to a specific type and may, for example, be a wavelength-variable Fabry-Perot etalon filter, an acousto-optical tunable filter (AOTF), a linear variable filter (LVF), or a liquid crystal tunable filter (LCTF), in each of which an electro-static actuator adjusts the size of the gap between two filters (mirrors) to control the wavelength of the reflected light that passes through the filter. Among the filters described above, the wavelength variable interference filter is preferably a Fabry-Perot etalon filter.

A Fabry-Perot etalon filter uses multiple interference that occurs between the two filters to extract reflected light having a desired wavelength. The spectroscopy section 4 can therefore be extremely thin, specifically, the thickness of the spectroscopy section 4 can be set at a value smaller than or equal to 2.0 mm. Therefore, the spectroscopy section 4 and in turn the spectroscopic system 10 can be more compact. Using a Fabry-Perot etalon filter as the wavelength variable filter therefore allows further reduction in size of the spectroscopic system 10.

The spectroscopy section 4 using a wavelength-variable Fabry-Perot etalon filter as the wavelength variable interference filter will be described below with reference to FIG. 5.

The Fabry-Perot etalon filter is an optical member having a rectangular-plate-like shape in the plan view and includes a fixed substrate 410, a movable substrate 420, a fixed reflection film 411, a movable reflection film 421, a fixed electrode 412, a movable electrode 422, and a bonding film 414. The fixed substrate 410 and the movable substrate 420 are integrally bonded to each other via the bonding film 414 with the fixed substrate 410 and the movable substrate 420 layered on each other.

The fixed substrate 410 has a groove 413 so formed in an etching process carried out in the thickness direction of the fixed substrate 410 as to surround a central portion of the fixed substrate 410 so that a reflection film placement section 415 is formed in the central portion. On the thus configured fixed substrate 410, a fixed optical mirror formed of the fixed reflection film 411 is provided on a side of the reflection film placement section 415 that is the side facing the movable substrate 420, and the fixed electrode 412 is provided on a side of the groove 413 that is the side facing the movable substrate 420.

The movable substrate 420 has a holding portion that is a groove 423 so formed in an etching process carried out in the thickness direction of the movable substrate 420 as to surround a central portion of the movable substrate 420 so that a movable portion that is a reflection film placement section 425 is formed in the central portion. On the thus configured movable substrate 420, a movable optical mirror formed of the movable reflection film 421 is provided on a side of the reflection film placement section 425 that is the side facing the fixed substrate 410, that is, the lower side of the movable substrate 420, and the movable electrode 422 is provided on a side of the movable substrate 420 that is the side facing the fixed substrate 410.

A portion of the movable substrate 420 that is the portion corresponding to the groove 423 is so formed as to be thinner than the reflection film placement section 425, so that the portion corresponding to the groove 423 functions as a diaphragm that is deformed by electrostatic attraction force produced when voltage is applied to the space between the fixed electrode 412 and the movable electrode 422.

The fixed substrate 410 and the movable substrate 420 can be produced as long as they each have a thickness greater than or equal to 0.1 mm but smaller than or equal to 1.0 mm. The thickness of the overall Fabry-Perot etalon filter can therefore be set at a value smaller than or equal to 2.0 mm, whereby the size of the spectroscopic system 10 can be reduced.

Between the thus configured fixed substrate 410 and movable substrate 420, the fixed reflection film 411 and the movable reflection film 421 are so disposed in a substantially central portion of the fixed substrate 410 and the movable substrate 420 as to face each other via a gap. Further, the fixed electrode 412 and the movable electrode 422 are so disposed in the respective grooves that surround the respective central portions described above as to face each other via a gap. Among the components described above, the fixed electrode 412 and the movable electrode 422 form an electrostatic actuator that adjusts the size of the gap between the fixed reflection film 411 and the movable reflection film 421.

The electrostatic attraction force produced when voltage is applied to the space between the fixed electrode 412 and the movable electrode 422, which form the electrostatic actuator, deforms the holding portion, which is the groove 423. As a result, the size of the gap, that is, the distance between the fixed reflection film 411 and the movable reflection film 421 can be changed. Setting the size of the gap as appropriate allows selection of the wavelength of the light passing through the Fabry-Perot etalon filter and selective output of light having a desired wavelength (light that belongs to desired wavelength region) from the incident light. Further, changing the configuration of the fixed reflection film 411 and the movable reflection film 421 allows control of the full width half maximum of the spectrum of the light passing through the Fabry-Perot etalon filter, that is, the resolution of the Fabry-Perot etalon filter.

The fixed substrate 410 and the movable substrate 420 are each made, for example, of any of a variety of glass materials, such as soda glass, crystalline glass, quartz glass, lead glass, potassium glass, borosilicate glass, and alkali-free glass, or crystal quartz. The bonding film 414 is formed, for example, of a plasma polymerization film made primarily of siloxane. The fixed reflection film 411 and the movable reflection film 421 are each formed, for example, of a metal film made, for example, of Ag, an alloy film made, for example, of an Ag alloy, or a dielectric multilayer film including a $TiO_2$ layer as a high refraction layer and an $SiO_2$ layer as a low refraction layer. The fixed electrode 412 and the movable electrode 422 are each made of any of a variety of electrically conductive materials.

The spectroscopic system 10 includes a moving mechanism 8, which moves the spectroscopy section 4 to a first position P1, where the spectroscopy section 4 faces the light source 3, and a second position P2, where the spectroscopy section 4 faces the imaging device 2, as shown in FIGS. 2 to 4. When the spectroscopy section 4 is located in the first position P1, the spectroscopy section 4 overlaps with the light source 3 when the enclosure 11 is viewed from the side facing the rear surface thereof and can spectrally separate the light outputted from the light source 3 and irradiate the measurement target X with the spectrally separated light. The spectrally separated light passes through the measurement target X, passes through the optical path changer 6, which changes the optical path of the light, and the resultant light is incident on the imaging device 2, whereby the measurement target X can be measured by using what is called a pre-stage spectroscopic method.

On the other hand, when the spectroscopy section 4 is located in the second position P2, the spectroscopy section 4 overlaps with the imaging device 2 when the enclosure 11 is viewed from the side facing the rear surface thereof. The light outputted from the light source 3 passes through the measurement target X, passes through the optical path changer 6, which changes the optical path of the light, and the spectroscopy section 4 can then spectrally separate the resultant light immediately before the light is incident on the imaging device 2 and cause the spectrally separated light to be incident on the imaging device 2, whereby the measurement target X can be measured by using what is called a post-stage spectroscopic method.

The spectroscopic system 10, which includes the moving mechanism 8, which moves the spectroscopy section 4 to the first position P1 in the optical path between the light source 3 and the optical path changer 6 and the second position P2 in the optical path between the optical path changer 6 and the imaging device 2, allows selection of the pre-stage spectroscopic method or the post-stage spectroscopic method in accordance with the situation in which the spectroscopic system 10 operates.

The thus configured moving mechanism 8 can be formed, for example, of a solenoid that is a drive source that moves the spectroscopy section 4. In the present embodiment, although not shown, the drive source is electrically coupled to the control section 5, which controls the action of the drive source. The spectroscopy section 4 can therefore be positioned with increased precision. Instead, for example, an operation knob may be linked to the spectroscopy section 4, and the operation knob may be manually operated to select the first position P1 or the second position P2.

Control Section 5

The control section 5 is formed, for example, of a processor that is provided in the enclosure 11 and is the combination of a CPU, a memory, and other components, and the control section 5 controls the action of each of the portions of the spectroscopic system 10, such as the light source 3, the imaging device 2, the spectroscopy section 4, and the moving mechanism 8. The control section 5 includes a storage section 17, a light source controller 501, a spectroscopy controller 502, a spectral image acquirer 503, an analysis processor 504, and a display controller 505.

When a pre-stage spectroscopic mode in which a spectroscopic camera based on the pre-stage spectroscopic method is activated is selected, the control section 5 reads software, such as a program, stored in the storage section 17 provided in the main body 1 in response to the user's operation instruction inputted to the input section 16. Based on the software, the control section 5 causes the moving mechanism 8 to move the spectroscopy section 4 to the first position P1 and controls the actions of the light source 3, the spectroscopy section 4, and the imaging device 2 to acquire a spectral image. The control section 5 then causes the display section 15 based on the spectral image to display the characteristics, constituent components, and other factors of the measurement target X. In contrast, when a post-stage spectroscopic mode based on the post-stage spectroscopic method is selected, the control section 5 causes the moving mechanism 8 to move the spectroscopy section 4 to the second position P2 and controls the actions of the light source 3, the spectroscopy section 4, and the imaging device 2. The control section 5 then, for example, identifies the imaged measurement target X based on the resultant spectral image and causes the display section 15 to display the characteristics, constituent components, and other factors of the measurement target X.

In the main body 1, the display 111 has both the functions of the display section 15 and the input section 16, as described above.

The light source controller 501 controls turning on and off the light source 3 based on the user's operation instruction inputted to the input section 16.

The spectroscopy controller 502 acquires a voltage value (input value) of the drive voltage corresponding to the spectrally selected wavelength to be outputted based on the V-λ, data stored in the storage section 17. The spectroscopy controller 602 then outputs an instruction signal that applies the acquired voltage value to the electrostatic actuator of the Fabry-Perot etalon filter as the spectroscopy section 4. Further, the spectroscopy controller 502, for example, evaluates whether measurement wavelength change timing is detected, the measurement wavelength is changed, the drive voltage is changed in accordance with the change in the measurement wavelength, and the measurement is terminated based on a variety of data stored in the storage section 17 and outputs an instruction signal based on the result of the evaluation.

The spectral image acquirer 503 causes the imaging device 2 to acquire light quantity measurement data (amount of received light) as the spectral image (capture spectral image) based on the reflected light reflected off the measurement target X and then stores the acquired spectral image in the storage section 17. The spectral image acquirer 503 also stores the measurement wavelength in the storage section 17 along with the spectral image when storing the spectral image in the storage section 17.

The analysis processor 504 acquires the spectral image (optical spectrum) and the measurement wavelength stored in the storage section 17 and analyzes the acquired spectral image (optical spectrum) and measurement wavelength. The analysis processor 604 then compares the result of the analysis with a database stored in the storage section 17, for example, to identify the imaged measurement target X.

The acquisition of the spectral image and the measurement wavelength performed by the analysis processor 504 can instead be directly performed by the spectral image acquirer 503 with no intervention of the storage section 17.

The display controller 505 causes the display section 15 to display information on the measurement target X identified by the analysis processor 504 as a visualizing image.

Examples of the visualizing image displayed on the display section 15 may include a letter string representing the composition of the identified measurement target X, the characteristics, constituent components, concentration, properties, and other pieces of information on the measurement target X, and may further include the accuracy (%) at which the measurement target X is recognized.

Display Section 15, Input Section 16, and Storage Section 17

In the main body 1, the display 111 has both the functions of the display section 15 and the input section 16, and the display section 15 is formed, for example, of any of a variety of display devices, such as a liquid crystal display and an organic EL display. The display section 15 is provided on the front side, that is, the main surface of the main body 1 and displays a variety of images, as shown in FIG. 1.

The input section 16 is provided, for example, on the surface of the display section 15, is formed of a touch panel including a touch sensitive surface and a sensor for detecting the magnitude of contact with the touch sensitive surface, and accepts the user's (operator's) input operation.

The storage section 17 is formed of any of a variety of storage devices (memories), such as a ROM and a RAM, and stores a variety of data, programs, and other pieces of information necessary for the control of the main body 1. Examples of the data may include application software, a program, and the like for achieving the functions of the control section 5 and may further include correlation data or the V-λ, data representing the relationship between drive voltage applied to an electrostatic actuator provided in a Fabry-Perot etalon filter and the wavelength of the light that passes through the Fabry-Perot etalon filter.

The main body 1 has been described.

Although not shown, optical systems, such as a light incident lens and a projection lens, are preferably built in the main body 1. The optical systems are preferably located on the light incident side of the spectroscopy section 4 and may move in accordance with the movement of the position of the spectroscopy section 4 or may be disposed in both the first and second positions P1, P2.

Attachment Member 7

The attachment member 7 includes an attachment mechanism 71, which is attached to the main body 1, and the optical path changer 6.

The attachment mechanism 71 includes a plate piece 711, which includes a recess 712, which holds a container box 100, which contains the measurement target X, and arms 713, which are provided at both ends of the plate piece 711. The attachment mechanism 71 is so attached to the main body 1 as to form the placement space S, in which the measurement target X is placed, between the optical path changer 6 and the main body 1.

The recess 712 has a depth deep enough for the container box 100 to be inserted into the recess 712 and is so provided as to be shifted from the center of the plate piece 711 toward one side thereof. In the state in which the attachment member 7 is attached to the main body 1, the bottom of the recess 712 is separate from the main body 1, and the portion that separates the bottom of the recess 712 and the main body 1 forms the placement space S described above. The plate piece 711 is substantially as long as the width of the enclosure 11 of the main body 1 and is so attached that the width direction of the enclosure 11 substantially coincides with the longitudinal direction of the plate piece 711.

The plate piece 711 links the arms 713 to each other, and the length of the plate piece 711 refers to the distance between the arms 713 separate from each other. The length of the plate piece 711 therefore includes the portion where the recess 712 is formed.

An engaging hook 714 is provided at the front end of each of the arms 713, that is, at the opposite-side ends of the plate piece 711. The engaging hooks 714 are so formed as to protrude from the arms 713 in the direction in which the engaging hooks 714 approach each other.

To attach the thus configured attachment member 7 to the main body 1, the main body 1 is inserted into the space between the arms 713 with the arms 713 bent in the direction in which the arms 713 separate away from each other. Removing the outer force exerted in the direction in which the arms 713 are separate away from each other allows the arms 713 to return to their natural state and come into contact with the widthwise edges of the main body 1. In this process, the engaging hooks 714 engage with the front surface of the main body 1 and are stably attached thereto. From the attached state, exerting external force in the direction in which the arms 713 are separate away from each other again allows the engaging hooks 714 to disengage from the main body 1, and the attached state is allowed to transition to a separate state.

In the attached state, the recess 712 is so located as to cover the light incident/exiting section 112 of the main body 1. The measurement target X can thus be measured.

In the present embodiment, the plate piece 711 is so attached to the main body 1 that the longitudinal direction of the plate piece 711 coincides with the width direction of the main body 1, but not necessarily. For example, the plate piece 711 may be so attached to the main body 1 that the longitudinal direction of the plate piece 711 coincides with the longitudinal direction of the main body 1. Still instead, the main body 1 may be provided with engaging portions that engage with the engaging hooks 714, or the main body 1 may be provided with an attachment mechanism itself.

Optical Path Changer 6

The optical path changer 6 has the function of changing the direction of the optical path of the light outputted from the light source 3 to cause the light to be incident on the imaging device 2, as shown in FIG. 3. In the present embodiment, the optical path changer 6 includes reflection members 61 and 62, which reflect the light to change the optical path thereof. The simple configuration that reflects light allows the optical path of the light to be changed and the transmitted light having passed through the measurement target X to be incident on the imaging device 2, as will be described below.

The reflection member 61 has a first reflection surface 611 and is located at the bottom of the recess 712 in a position corresponding to the light source 3, that is, in the optical axis of the light outputted from the light source 3. The light having been outputted from the light source 3 and having passed through the measurement target X is therefore reflected off the first reflection surface 611. The first reflection surface 611 reflects the light toward a second reflection surface 621 of the reflection member 62.

The reflection member 62 has the second reflection surface 621, is located at the bottom of the recess 712 in a position corresponding to the imaging device 2, that is, in the optical axis of the imaging device 2, and reflects the light reflected off the first reflection surface 611 toward the imaging device 2.

As described above, the reflection member 61 has the first reflection surface 611, which reflects the light outputted from the light source 3, and the reflection member 62 has the second reflection surface 621, which reflects the light reflected off the first reflection surface 611 toward the imaging device 2.

The thus configured optical path changer 6 allows the light outputted from the light source 3 to be reflected off the reflection members 61 and 62 and incident on the imaging device 2. In the configuration shown in FIG. 3, during the process described above, the light outputted from the light source 3 passes through the container box 100, that is, the measurement target X in the course from the light source 3 to the reflection member 61 and passes through the measurement target X again in the courser from the reflection member 62 to the imaging device 2. Further, in the pre-stage spectroscopic mode, the light outputted from the light source 3 is spectrally separated in the course from the light source 3 to the measurement target X, and the spectrally separated light is incident on the imaging device 2 via the optical path described above. On the other hand, in the post-stage spectroscopic mode, the light outputted from the light source 3 is spectrally separated in the course from the measurement target X to the imaging device 2, and the spectrally separated light is incident on the imaging device 2.

As described above, the spectroscopic system 10 includes the main body 1 including the light source 3, which radiates light to the light transmissive measurement target X, the imaging device 2, which captures an image based on the transmitted light having passed through the measurement target X, and the spectroscopy section 4, which is provided in the optical path between the light source 3 and the imaging device 2 and selectively transmits light that belongs to a specific wavelength region, and the attachment member 7, which includes the optical path changer 6, which changes the direction of the optical path of the light outputted from the light source 3, and is so attached to the main body 1 as to form the placement space S, which is located between the optical path changer 6 and the main body 1 and in which the measurement target X is placed. The attachment member 7 is attachable to and detachable from the main body 1.

The measurement target X can therefore be measured in a variety of manners by using the simple method including the step of placing the container box 100, which contains the measurement target X, in the recess 712 of the attachment member 7 and attaching the attachment member 7 in this state to the main body 1. In the state in which the attachment member 7 is not attached to the main body 1, the main body 1 can be used, for example, as a smartphone. That is, when the main body 1 is not used as a measurement apparatus, the size of the main body 1 can be reduced by keeping the attachment member 7 separate from the main body 1.

In the placement space S is placed the container box 100, which is a container that contains a gas or a liquid. The characteristics, constituent components, properties, and other factors of the gas or the liquid can therefore be identified.

In the present embodiment, the reflection member 61, which has the first reflection surface 611, and the reflection member 62, which has the second reflection surface 621, are formed of separate elements, but not necessarily. For example, the reflection members 61 and 62 may be integrated with each other. That is, a single reflection member may have the first reflection surface 611 and the second reflection surface 621.

The present embodiment employs the configuration in which light passes through the measurement target X both between the light source 3 and the optical path changer 6, that is, in the outward path and between the optical path changer 6 and the imaging device 2, that is, in the inward path, but not necessarily in the present disclosure, and light may pass through the measurement target X in one of the outward and inward paths. That is, in the attached state, the placement space S may be present only on the side facing the light source 3 or the imaging device 2.

The spectroscopic system 10 may instead be dedicated to the front-stage or post-stage spectroscopic method with the moving mechanism 8 omitted.

Method for Identifying Measurement Target X

A method for identifying the measurement target X by using the spectroscopic system 10 will next be described below in detail with reference to FIG. 6 and other figures. That is, an identification method including the steps of causing the control section 5 to execute a program stored in the storage section in the main body 1 to issue an instruction to cause the control section 5 to identify the measurement target X and identifying the measurement target X based on the instruction.

The following description will be made of a case by way of example where an image of the measurement target X is captured, the measurement target X is identified based on the captured spectral image, and an image of the identified measurement target X is then displayed on the display 111.

<1> The user first operates the input section 16 to activate application software that captures an image of the measurement target X and then selects a condition, such as an image capturing mode, in accordance with an instruction issued by the application software (S1).

That is, one of the pre-stage spectroscopic mode and the post-stage spectroscopic mode is selected.

The following description will first be made of the case where the post-stage spectroscopic mode is selected and then the case where the pre-stage spectroscopic mode is selected.

Post-Stage Spectroscopic Mode

<2A> The spectroscopy section 4 is then moved to the second position P2 in accordance with the user's input instruction performed on the input section 16 and representing selection of the post-stage spectroscopic mode, and in this state, the light source controller 501 turns on the light source (S2A).

When the light source 3 is turned on, the measurement target X is directly irradiated with the output light (illumination light) outputted from the light source 3. The radiated light then passes through the measurement target X, and the transmitted light is reflected off the reflection members 61 and 62 and directed to the imaging device 2. In the present mode, the light enters the spectroscopy section 4 immediately before incident on the imaging device 2.

<3A> The spectroscopy controller 502 then acquires a voltage value (input value) of the drive voltage corresponding to the spectrally separated wavelength to be outputted based on the V-λ, data stored in the storage section 17. The spectroscopy controller 502 then outputs an instruction signal that applies the acquired voltage value to the electrostatic actuator of the Fabry-Perot etalon filter as the spectroscopy section 4 (S3A).

As a result, out of the light incident as the incident light from the measurement target X on the spectroscopy section 4, light having the specific wavelength is selectively outputted as the output light toward the imaging device 21.

Before the spectroscopy section 4 outputs the light having the specific wavelength, the spectroscopy controller 502 preferably performs adjustment or calibration of the spectroscopy section 4.

<4A> The spectral image acquirer 503 then controls the action of the imaging device 21 to cause the imaging device to acquire the light having the specific wavelength outputted as the output light from the spectroscopy section 4 as the spectral image. That is, out of the transmitted light having passed through the measurement target X, the spectral image acquirer 503 causes the imaging device 21 to acquire light quantity measurement data (amount of received light) on the light having the specific wavelength as the spectral image. The spectral image acquirer 503 then stores the acquired spectral image in the storage section 17 along with the measurement wavelength (S4A).

In the post-stage spectroscopic mode described above, the spectroscopy section 4 is disposed in the optical axis of the light received by the imaging device 21 between the measurement target X and the imaging device 21. Therefore, the spectroscopy section 4 transmits only the light having the specific wavelength contained in the light having passed through the measurement target X, and the imaging device 21 spectrally measures the intensity of the light having the specific wavelength.

<5A> After the acquisition of the spectral image of the light having the first wavelength, whether or not acquisition of a spectral image of light having a second wavelength different from the first wavelength is required is evaluated based on the condition selected by the user in the step <1> described above. That is, whether or not subsequent acquisition of a spectral image of light having a second wavelength different from the first wavelength is required is evaluated (S5A).

In a case where the result of the evaluation (S5A) shows that acquisition of a spectral image of light having a second wavelength is required, the step <3A> described above to the present step <5A> are repeatedly carried out for the light having the second wavelength in place of the light having the first wavelength. A spectral image of the light having the second wavelength is thus acquired. The acquisition of the spectral image of light having the second wavelength, that is, a different wavelength is repeatedly performed from the first acquisition, second acquisition to n-th acquisition. Repeatedly carrying out the step <3A> described above to the present step <5A> as described above allows two-dimensional spectral information representing a wavelength versus optical intensity relationship.

On the other hand, when it is unnecessary to acquire a spectral image of light having the following wavelength, the spectral image acquisition performed in the post-stage spectroscopic mode is terminated, and the control proceeds to analysis of the spectral image, which is the following step <6>.

The post-stage spectroscopic mode described above allows acquisition a specific wavelength and the shape of a spectrum by repeating the step <3A> described above to the present step <5A> to scan the wavelengths over a certain measurement range (predetermined area) to grasp the characteristics of the measurement target X. It can therefore be said that the post-stage spectroscopic mode is a measurement mode effective when a measurement target X that is unknown in terms of specific wavelength is measured (imaged).

Pre-Stage Spectroscopic Mode

<2B> The spectroscopy section 4 is moved to the first position P1 in accordance with the user's input instruction performed on the input section 16 and representing selection of the pre-stage spectroscopic mode, and in this state, the light source controller 501 turns on the light source 3 (S2B).

When the light source 3 is turned on, the output light (illumination light) outputted from the light source 3 directly enters as the incident light the spectroscopy section 4.

<3B> The spectroscopy controller 502 then acquires a voltage value (input value) of the drive voltage corresponding to the spectrally separated wavelength to be outputted based on the V-λ, data stored in the storage section 17. The spectroscopy controller 502 then outputs an instruction signal that applies the acquired voltage value to the electrostatic actuator of the Fabry-Perot etalon filter as the spectroscopy section 4 (S3B).

As a result, out of the light incident as the incident light from the light source 3 on the spectroscopy section 4, light having the specific wavelength is selectively outputted as the output light toward the measurement target X. The radiated light having the specific wavelength then passes through the measurement target X, is reflected off the reflection members 61 and 62, and is incident on the imaging device.

In the pre-stage spectroscopic mode described above, the spectroscopy section 4 is disposed in the optical axis of the light outputted from the light source 3 between the light source 3 and the measurement target X. Therefore, the spectroscopy section 4 selectively transmits the light having the specific wavelength contained in the light outputted from the light source 3, the measurement target X is selectively irradiated with the light having the specific wavelength.

Before the spectroscopy section 4 outputs the light having the specific wavelength, the spectroscopy controller 502 preferably performs adjustment or calibration of the spectroscopy section 4.

<4B> The spectral image acquirer 503 then controls the action of the imaging device 21 to cause the imaging device 21 to acquire the light (incident light) having the specific wavelength reflected off the measurement target X as the spectral image. That is, the spectral image acquirer 503 causes the imaging device 21 to acquire light quantity measurement data (amount of received light) on the light reflected off the measurement target X and having the specific wavelength as the spectral image. The spectral image acquirer 503 then stores the acquired spectral image in the storage section 17 along with the measurement wavelength (S4B).

<5B> After the acquisition of the spectral image of the light having the first wavelength, whether or not acquisition of a spectral image of light having a second wavelength different from the first wavelength is required is evaluated based on the condition selected by the user in the step <1> described above. That is, whether or not subsequent acquisition of a spectral image of light having a second wavelength different from the first wavelength is required is evaluated (S5B).

In a case where the result of the evaluation (S5B) shows that acquisition of a spectral image of light having the following wavelength is required, the step <3B> described above to the present step <5B> are repeatedly carried out for the light having the second wavelength in place of the light having the first wavelength. A spectral image of the light having the second wavelength is thus acquired. The acquisition of the spectral image of light having the second wavelength, that is, a different wavelength is repeatedly performed from the first acquisition, second acquisition to n-th acquisition. Repeatedly carrying out the step <3B> described above to the present step <5B> as described above allows two-dimensional spectral information representing a wavelength versus optical intensity relationship.

On the other hand, when it is unnecessary to acquire a spectral image of light having the following wavelength, the spectral image acquisition performed in the pre-stage spectroscopic mode is terminated, and the control proceeds to analysis of the spectral image, which is the following step <6>.

The pre-stage spectroscopic mode described above allows grasp of the characteristics of the measurement target X by radiating the light having the specific wavelength in the step <3B> described above to the present step <5B>. It can therefore be said that the pre-stage spectroscopic mode is effective when a measurement target X known in terms of specific wavelength is measured and allows a decrease in the amount of information on the result of the measurement as compared with the post-stage spectroscopic method for a decrease in measurement period.

The analysis processor 504 then analyzes the spectral image based on the spectral image (optical spectrum) and the measurement wavelength stored in the storage section 17.

That is, the analysis processor 504 acquires the spectral image (optical spectrum) and the measurement wavelength stored in the storage section 17 in the post-stage spectroscopic mode or the pre-stage spectroscopic mode described above. The analysis processor 504 then analyzes the spectral image (optical spectrum) and the measurement wavelength and extracts characteristic quantities of the measurement target X based on the result of the analysis, for example, to identify the imaged measurement target X by comparing the characteristic quantities with the database stored in the storage 17 and containing a reference spectrum, learned data, and other data.

The display controller 505 then creates information on the measurement target X identified by the analysis processor 504 as a visualizing image and then causes the display 111, which includes the display section 15, to display the visualizing image (S7).

The spectroscopic system 10 identifies the measurement target X by carrying out the steps <1> to <7> as described above.

As described above, the main body 1 includes the display 111, which serves both as the display section 15 and the touch sensitive surface, at least one sensor for detecting contact with the display 111, at least one processor, the storage section 17, which is a memory, and at least one program. The at least one program is stored in the storage section 17, is executed by the at least one processor, and contains instructions for executing any of the spectroscopic methods described above. The measurement target X can thus be measured, as described above.

Second Embodiment

A second embodiment of the spectroscopic system will next be described.

FIG. 7 is a cross-sectional view of the spectroscopic system according to the second embodiment of the present disclosure.

A spectroscopic system 10 according to the second embodiment will be described below primarily on differences from the spectroscopic system 10 according to the first embodiment described above, and the same items as those in the first embodiment will not be described.

The optical path changer 6 includes a reflection member 63 in the present embodiment, as shown in FIG. 7. The reflection member 63 has a reflection surface 631, which faces the placement space S. In the present embodiment, the light source 3 outputs light toward a substantially central portion of the reflection surface 631, and the light reflected off the reflection surface 631 is incident on the imaging device 2. That is, the optical axis of the light source 3 intersects the optical axis of the imaging device 2 at the reflection surface 631.

According to the thus configured present embodiment, the optical path changer 6 reflects the light only once, that is, the optical path changer 6 reflects the light fewest possible times. The attenuation of the amount of light due to the reflection can therefore be minimized, whereby more accurate measurement can be performed.

Third Embodiment

A third embodiment of the spectroscopic system will next be described.

FIG. 8 is a cross-sectional view of the spectroscopic system according to the third embodiment of the present disclosure.

A spectroscopic system 10 according to the third embodiment will be described below primarily on differences from the spectroscopic system 10 according to the first embodiment described above, and the same items as those in the first embodiment will not be described.

The optical path changer 6 includes a prism 64 in the present embodiment, as shown in FIG. 8. The prism 64 has a first reflection surface 641 and a second reflection surface 642 and has a triangular cross-sectional shape.

The first reflection surface 641 is located at the bottom of the recess 712 in a position corresponding to the light source 3, that is, in the optical axis of the light outputted from the light source 3. The light outputted from the light source 3 therefore enters the prism 64 and is reflected off the first reflection surface 641. The first reflection surface 641 reflects the light toward the second reflection surface 642.

The second reflection surface 642 is located at the bottom of the recess 712 in a position corresponding to the imaging device 2, that is, in the optical axis of the imaging device 2 and reflects the light reflected off the first reflection surface 641 and passing through the prism 64 toward the imaging device 2.

According to the thus configured present embodiment, the same effects as those provided by the first embodiment can be provided, and the number of parts can be reduced as compared with that in the first embodiment. It can be said that the prism 64 is a light guiding member including a light incident portion on which the light from the light source 3 is incident and a light exiting portion via which the light exits toward the imaging device 2.

Fourth Embodiment

A fourth embodiment of the spectroscopic system will next be described.

FIG. 9 is a cross-sectional view of the spectroscopic system according to the fourth embodiment of the present disclosure.

A spectroscopic system 10 according to the fourth embodiment will be described below primarily on differences from the spectroscopic system 10 according to the first embodiment described above, and the same items as those in the first embodiment will not be described.

The optical path changer 6 includes a light guiding member 65, which includes a light incident section 651, on which the light from the light source 3 is incident, and a light exiting section 652, via which the light exits toward the imaging device 2, in the present embodiment, as shown in FIG. 9. The light guiding member 65 is formed, for example, of an elongated optical fiber or light guide curved or bent at the middle of the light guiding member 65 in the longitudinal direction thereof. An end surface of the light guiding member 65 that is the end surface on which the light from the light source 3 is incident is the light incident section 651, and the other end surface of the light guiding member 65 is the light exiting section 652.

The light incident section 651 is located at the bottom of the recess 712 in a position corresponding to the light source 3, that is, in the optical axis of the light outputted from the light source 3. The light exiting section 652 is located at the bottom of the recess 712 in a position corresponding to the imaging device 2, that is, in the optical axis of the imaging device 2. The light incident on the light incident section 651 repeatedly undergoes reflection multiple times in the light guiding member 65, reaches, that is, is guided to the light exiting section 652, and exits via the light exiting section 652.

According to the thus configured present embodiment, the same effects as those provided by the first embodiment can be provided, and the number of parts can be reduced as compared with that in the first embodiment. Further, since the optical fiber or the light guide described above is flexible, it is advantageously easy to adjust the positions of the light incident section 651 and the light exiting section 652.

For example, in the embodiments described above, the actions of the light source 3, the imaging device 2, the spectroscopy section 4, and other components are controlled by the control section 5 built in the main body 1, but not necessarily, and at least one of the components described above may be controlled, for example, by a control section provided in an apparatus external to the main body 1 or an arbitrary control section communicable with the main body 1 or connected via a network.

The above description has been made of the case where the main body includes the display section, the input section, and the storage section, but not necessarily. The display section and the input section may be provided in an external terminal, such as another smartphone or a computer different from the main body. Further, the storage section may be provided in an external server, and the smartphone including the imaging device may transmit and receive data to and from the external terminal and the external server via a communication section.

Further, the main body is not limited to a smartphone and may instead be any of a variety of apparatuses having an imaging function, such as a digital camera, a tablet personal computer (PC), a drone, a robot, a cash dispenser and a face authentication sensor, and a head mounted display (HMD).

An auxiliary optical path changer that is formed, for example, of a reflection surface and changes the direction of the optical path may be provided in the optical path both between the light source and the measurement target and between the measurement target and the imaging device.

What is claimed is:

1. A spectroscopic system comprising:
a main body including:
a light source configured to radiate light to a light transmissive measurement target;
an imaging device configured to capture an image based on transmitted light that is generated by passing the light through the measurement target;
a spectroscopy section that is provided in an optical path between the light source and the imaging device and is configured to selectively transmit light that belongs to a specific wavelength region; and a moving mechanism configured to selectively move the spectroscopy section between a first position and a second position; and an attachment that is attached to the main body, the attachment including:
  an optical path changer configured to change an optical path direction of the light from the light source; and
  a placement space which is located between the optical path changer and the main body and in which the light transmissive measurement target is placed, wherein, when the spectroscopy section is in the first position, the spectroscopy section is located between the light source and the light transmissive measurement target in the optical path, and the light from the light source passes through the spectroscopy section before the light enters the light transmissive measurement target, and when the spectroscopy section is in the second position, the spectroscopy section is located between the light transmissive measurement target and the imaging device in the optical path, and the transmitted light from the light transmissive measurement target passes through the spectroscopy section before the transmitted light enters the imaging device.

2. The spectroscopic system according to claim 1, wherein the attachment is attachable to and detachable from the main body.

3. The spectroscopic system according to claim 1, wherein the light source and the imaging device face toward a same direction along the optical path.

4. The spectroscopic system according to claim 3, wherein a direction in which the light source outputs the light and a direction in which the transmitted light is incident on the imaging device are opposite to each other.

5. The spectroscopic system according to claim 1, wherein the optical path changer includes a reflector that reflects the light to change the optical path direction.

6. The spectroscopic system according to claim 5, wherein the reflector has a first reflection surface that reflects the light outputted from the light source and a second reflection surface that reflects the light reflected off the first reflection surface toward the imaging device.

7. The spectroscopic system according to claim 1, wherein the optical path changer includes a light guide that includes a light incident section on which the light from the light source is incident and a light exiting section via which the light exits toward the imaging device.

8. The spectroscopic system according to claim 1, wherein a container that contains a gas or a liquid is placed in the placement space.

9. The spectroscopic system according to claim 1,
wherein the main body includes a display section, at least one processor, a memory, and at least one program, and
the at least one program is stored in the memory, is executed by the at least one processor, and contains instructions for executing any of spectroscopic methods.

* * * * *